Figure 1:
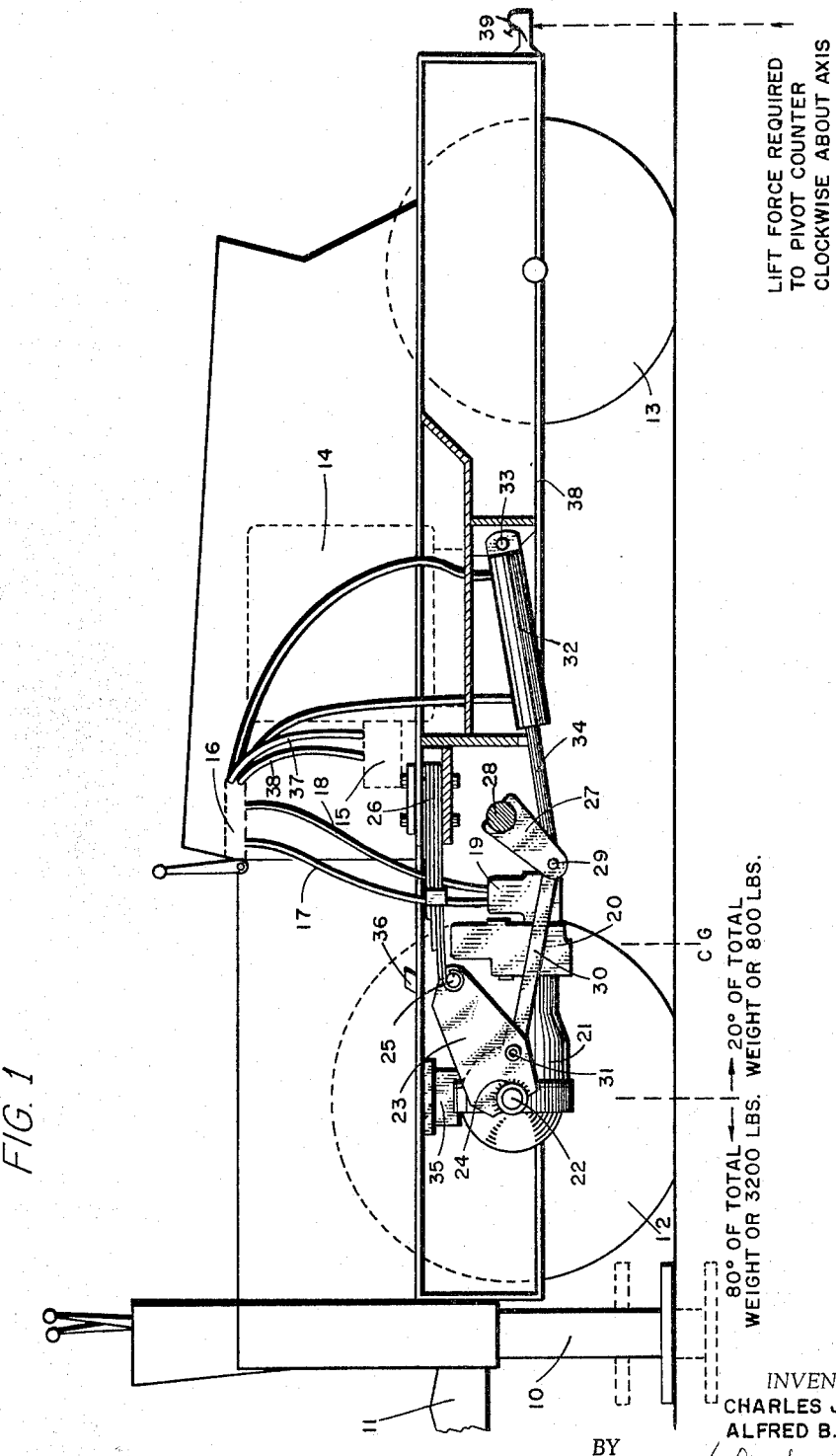

INVENTORS
CHARLES J. DAVIS,
ALFRED B. MAYFIELD
BY
*Hubert Miller*
ATTORNEY 3,283,841
HEAVY SELF-PROPELLED WORK
PERFORMING VEHICLE
Charles J. Davis, 22 Colonial, Wichita, Kans., and Alfred
B. Mayfield, Halstead, Kans.; said Mayfield assignor to said Davis
Filed Nov. 27, 1964, Ser. No. 414,258
6 Claims. (Cl. 180—14)

This invention relates generally to heavy work performing vehicles and more particularly to a wheel mounting structure for at least one pair of the supporting wheels of such a vehicle.

The problem of quickly transporting heavy work performing vehicles from one work site to a distant work site has long been recognized as very difficult of solution. Their road or highway speed under their own power is entirely too slow, and their ground clearance is very small. If an attempt is made to tow them on their own wheels at a higher speed, proper steering is almost impossible, particularly if one or the other end of the work vehicle is supported on steerable castering wheels. The provision of a transporting truck or trailer is expensive, and the loading of such a work vehicle onto such a truck or trailer requires several men plus extra equipment.

It is a primary object of this invention to provide a work vehicle construction which affords an increase in road clearance to facilitate the towing of the vehicle on a pair of its own supporting wheels; which allows the vehicle to be towed with its steerable wheels raised above the road or highway; which relieves the towing vehicle from having to support more than a very minute percentage of the total weight of the towed work vehicle, thus allowing a light pick-up truck or even a passenger car to be used for towing the work vehicle; and, last but not least, a construction which makes it possible for the operator of the work vehicle, unassisted, to lift the tow hitch end of the work vehicle and attach it to the towing vehicle for road transport.

All the above objects are accomplished by a novel crank arm type wheel mounting assembly for one co-operating pair of the transport wheels of the work vehicle. A wheel mounting embodying my invention constitutes a means for raising the entire vehicle with relation to its supporting ground or road surface to increase road clearance, and for simultaneously moving the transverse wheel axis of the pair of supporting wheels toward the vehicle center of gravity until it lies in a vertical transverse plane immediately adjacent a vertical transverse plane which passes through the center of gravity. A new location for the fore and aft center of moments (the wheel axle) is thus established, and the location is such that the moment of the force acting forward of the transverse wheel axis substantially balances the moment of the force acting aft of the wheel axis. Consequently, it becomes an easy task for one man to lift the forward or steering end of the vehicle and attach it to a towing vehicle.

Figure 2:
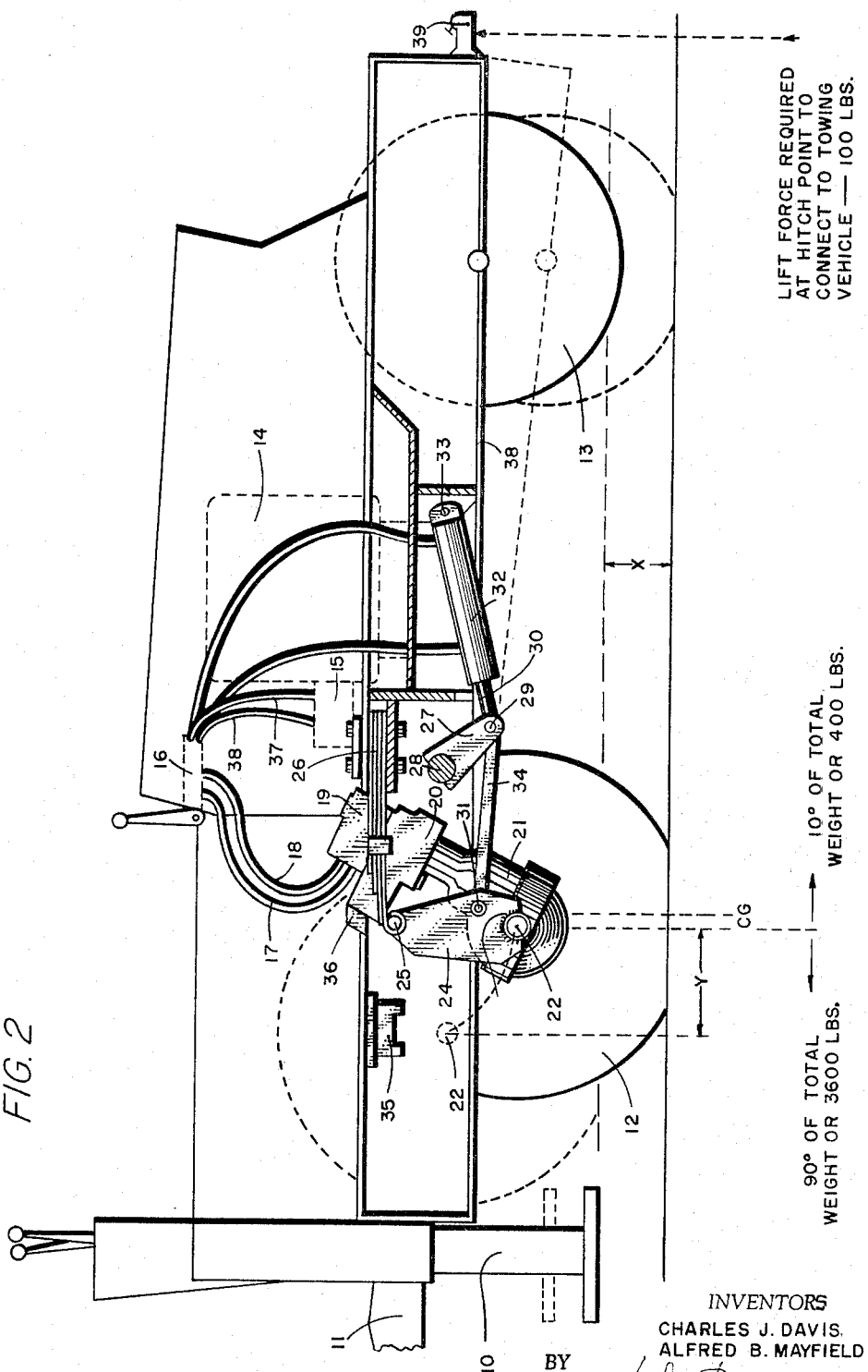

The inventions will be more clearly understood when the following description is read in connection with the accompanying drawings, in which:

FIG. 1 is schematic side elevational view of a self-propelled vehicle which carries a heavy mechanical shovel at one end, the shovel being shown only partially; certain parts of the vehicle being removed, and some parts being shown in phantom or in section, the wheel mounting embodying my invention being shown with the drive wheels in a position for shovel operation; and FIG. 2 is a similar view of the same vehicle with the wheels being shown in road transport towing position.

The particular vehicle shown includes a pair of laterally spaced conventional hydraulically operated stabilizer legs 10, which are rigidly secured to the working end of the vehicle, and to which is secured a heavy conventional mechanical shovel, indicated by the numeral 11, and shown only fragmentarily.

This particular vehicle is propelled by means of a hydrostatic drive which drives a pair of laterally spaced drive wheels 12. The opposite or towing end of the vehicle is supported by steerable wheels 13. The invention is not in any way restricted, however, to a vehicle having a hydrostatic drive or any other particular type of drive.

The hydrostatic drive shown includes an engine 14 which drives a hydraulic pump 15. Pump 15 supplies motive fluid to hydraulic motor 19 through conduits 37 and 38, a control valve 16, and flexible conduits 17 and 18.

The motor housing is rigidly secured to the housing of a gear reducing transmission 20, which is in turn rigidly secured to a differential gear housing 21, which journals wheel axles 22. The motor 19, the transmission housing 20, the differential and axle housing 21, the pair of wheels 12, and a pair of laterally spaced rigid crank arms 23 will be hereinafter referred to as a wheel assembly or drive wheel assembly.

Each of the pair of heavy laterally spaced crank arm plates 23 has one end welded as at 24 to the axle journaling portions of the differential housing 21, and their opposite ends pivotally mounted on transversely aligned axes or hinge pins 25. Two laterally spaced leaf springs 26 have their inner ends rigidly anchored to the vehicle frame, as shown, at opposite sides of the vehicle, with the free ends of the springs projecting aft to journal the pins 25 in transverse alignment.

From FIGS. 1 and 2 of the drawings, it will be seen that the described mounting for the drive wheel assembly permits the entire assembly to swing about the transverse axis 25, from the position shown in FIG. 1 to the position shown in FIG. 2.

As a means of swinging the drive wheel assembly from its FIG. 1 position to its FIG. 2 poistion, there is provided a pair of laterally spaced crank arms 27, each having an end rigidly secured to a respective end of a transverse rock shaft 28, journaled on the vehicle frame. Each crank arm 27 has its outer or free end pivotally connected at 29 to respective laterally spaced links 30. The other end of each of the links 30 is connected pivotally at 31 to the respective crank arms 23, at points spaced from the swing axis 25.

A hydraulic working cylinder 32 has its head end pivotally mounted on the vehicle frame at 33. The outer or free end of the piston rod 34 is pivotally connected at 29 to a crank arm 27. By extending the piston rod 34 by means of the control valve 16, the drive wheel assembly can be moved into the position shown in FIG. 1, in which position a portion of the differential housing 21 abuts a fixed stop 35 carried by the vehicle frame. With the drive wheels in this position the stabilizer legs 10 can be lowered into ground contact and work with the mechanical shovel may proceed in the usual manner.

After a particular ground working job has been completed and it is desired to tow the vehicle to a new location, the piston rod 34 of the cylinder 32 is retracted, and the crank arms 27 and their connected links 30 move the drive wheel assembly into the position shown in FIG. 2. In this position, a portion of the gear transmission housing 20 contacts a fixed stop 36, carried by the vehicle frame.

Referring to FIG. 1, it will be seen that with the drive wheel assembly in the position shown the leaf springs 26 are ineffective because the weight of the vehicle is transmitted through the stop 35 and the differential housing 21 to the wheel axles. However, when the drive wheel assembly is moved to the position shown in FIG. 2 the common axis 22 of the wheels 12 is almost directly under the swing axis 25, and the load of the vehicle is transmitted through the springs 26, the crank arms 23, the axle housing, to the wheels. Thus the springs 26 are fully effective to absorb road shocks.

As indicated in FIG. 2 the described swinging movement of the drive wheel assembly has moved the drive wheel axis 22 away from the shovel supporting end of the vehicle and toward a plane C.G. which passes through the center of gravity of the vehicle. Similarly the wheel axis 22 has dropped with relation to the frame a distance X, thus in effect raising the entire vehicle by that distance. It will be understood that the fixed stop 36 can be placed at any desired position so that the location of the wheel axis 22 will lie in a plane which coincides with the vertical plane C.G. passing through the center of gravity of the vehicle, if desired. The primary object of course is to move the wheel axis 22 sufficiently near the plane of the center of gravity so that it will require a very small lifting force to raise the front end of the vehicle and attach it to a towing vehicle.

In the drive wheel axis position illustrated in FIG. 2, approximately 90% of the total weight of the vehicle lies aft of the wheel axis 22, the approximately 10% of the total weight lies forward of this wheel axis. However, the moments of force acting on the vehicle about the axis 22 are such that only approximately 100 lbs. lifting force is required to lift the front end of the vehicle. The described arrangement also results in the towing vehicle having to support only a very small percentage of the total weight of the heavy work performing vehicle. It will be noted that in its towing position as shown in FIG. 2, the steerable wheels 13 are raised well above a ground contacting position, and cannot in any way interfere with the proper towing of the vehicle on its drive wheels 12.

Having described the invention with sufficient clarity to enable those familiar with this art to construct and use it, we claim:

1. A self-propelled vehicle comprising:
    a rigid elongated frame which supports a power unit;
    at least one transporting wheel mounted near the front end of said frame;
    a transverse rear axle housing having axle ends projecting from the opposite ends thereof;
    a pair of rear transport wheels, one mounted on each axle end;
    laterally spaced crank arms disposed radially and oriented identically with respect to said rear axle housing, each crank arm having an end rigidly secured to said axle housing;
    means pivotally securing the respective opposite ends of said crank arms to said frame on a common transverse axis to afford fore and aft swinging movement of the axle housing and its wheels about the crank arm axis, the transverse crank arm axis lying in a plane immediately adjacent a vertical transverse plane passing through the vehicle center of gravity;
    controllable power means carried by the vehicle and connected to swing the axle housing and its transport wheels to selected positions about the crank arm axis to vary the fore and aft distance between the rear wheel axis and the vertical transverse plane which passes through the vehicle center of gravity, and consequently to vary the lift force required to raise and pivot the front end of the vehicle about the transverse rear wheel axis.

2. The mechanism described in claim 1, and means carried by the frame for contacting and limiting the swinging movement of the described rear wheel and axle housing assembly in both directions about the crank arm swing axis.

3. The mechanism described in claim 1, and stop means on said frame limiting the swinging movement of said axle housing about the crank arm swing axis between a position aft of said swing axis and remote from the center of gravity of the vehicle, and a position substantially vertically beneath the swing axis and immediately adjacent a vertical transverse plane passing through the vehicle center of gravity.

4. The mechanism described in claim 1, in which the described rear axle housing, rear wheels and crank arms constitute a vehicle drive wheel assembly, in which the axle housing includes a differential gear housing;
    a transmission gear housing rigidly connected to the differential gear housing to transmit power to the gears therein;
    a fluid driven motor rigidly connected to the transmission gear housing to transmit power to the gears therein;
    a power driven fluid pump carried by the frame;
    flexible conduit connections between the pump and the fluid motor to transmit motive fluid to the motor, whereby the drive wheel assembly, including the connected differential gear housing, the connected transmission gear housing and the connected fluid motor all swing as a unit about the fixed, transverse crank arm axis, and motive fluid from the pump can be transmitted to the fluid motor for driving the rear drive wheels regardless of the shifting of the connected drive wheel assembly elements about the crank arm axis.

5. The mechanism described in claim 1 in which the means securing the ends of the two crank arms to the frame includes a pair of laterally spaced springs each having one end secured to said frame; and a pivot pin connecting the free end of each spring pivotally to a respective crank arm end.

6. A self-propelled vehicle comprising:
    a rigid frame having spaced parallel side members and a tow hitch at its forward end;
    a steerable wheel supporting the forward end of the frame;
    a drive wheel assembly mounted near and supporting the aft end of the frame, said drive wheel assembly comprising
        (1) a transversely disposed differential gear and axle housing with wheel axles projecting from the opposite ends thereof;
        (2) a drive wheel on the projecting end of each axle;
        (3) a gear transmission housing rigidly connected to said differential housing to transmit power thereto;
        (4) an hydraulic motor rigidly connected to said gear transmission housing to transmit power thereto;
        (5) a pair of rigid, laterally spaced crank arms each having an end rigidly secured to said axle housing, one near each end thereof and projecting radially outward therefrom, both said crank arms being like oriented with respect to the differential and axle housing;
    means pivotally securing the respective opposite ends of said crank arms to said frame on a common transverse axis to afford swinging movement of the entire drive wheel assembly about said axis;
    means on said frame limiting the swinging movement of said drive wheel assembly in both directions about its swinging axis;
    an hydraulic working cylinder having one end pivotally connected to said frame;
    means pivotally connecting the other end of said cylinder to at least one of said crank arms at a point spaced from the swinging axis thereof to selectively swing the entire drive wheel assembly about said swing axis:
    a power driven pump carried by said frame;
    flexible conduit connections between said pump and said hydraulic motor to transmit motive fluid thereto regardless of the relative position of the drive wheel assembly with respect to the frame, whereby the swinging of said drive wheel assembly from a position in which the drive wheel axis is located between the swinging axis and the aft end of the vehicle to a position in which the drive wheel axis is located beneath the swinging axis results in relative shift of the center of gravity of the vehicle toward the drive wheel axis, and consequently reduces the lift force required to lift and attach the forward end of the vehicle to a towing vehicle, and the shift in the location of the wheel axis simultaneously raises the vehicle frame to provide greater road clearance.

References Cited by the Examiner

UNITED STATES PATENTS

| | | | |
|---|---|---|---|
| 2,721,405 | 10/1955 | Gardner | 94—50 |
| 2,835,400 | 5/1958 | Latzke | 280—43.23 X |
| 2,978,967 | 4/1961 | MacDonald | 94—50 |
| 2,985,080 | 5/1961 | Harrison et al. | 280—43.23 X |

BENJAMIN HERSH, *Primary Examiner.*

C. C. PARSONS, *Assistant Examiner.*